United States Patent
Blumer et al.

(10) Patent No.: US 10,628,998 B2
(45) Date of Patent: Apr. 21, 2020

(54) SYSTEM AND METHOD FOR THREE DIMENSIONAL OBJECT RECONSTRUCTION AND QUALITY MONITORING

(71) Applicant: OneVisage SA, Lausanne (CH)

(72) Inventors: Clemens Blumer, Basel (CH); Christophe Remillet, Lausanne (CH)

(73) Assignee: OneVisage SA, Lausanne (CH)

( * ) Notice: Subject to any disclaimer, the term of this patent is extended or adjusted under 35 U.S.C. 154(b) by 181 days.

(21) Appl. No.: 15/852,511

(22) Filed: Dec. 22, 2017

(65) Prior Publication Data

US 2018/0247451 A1    Aug. 30, 2018

Related U.S. Application Data

(63) Continuation-in-part of application No. 15/030,837, filed as application No. PCT/IB2014/002226 on Oct. 24, 2014.

(30) Foreign Application Priority Data

Oct. 25, 2013    (CH) .................................. CH01801/13

(51) Int. Cl.
*G06T 17/20*    (2006.01)
*G06T 15/04*    (2011.01)
(Continued)

(52) U.S. Cl.
CPC .............. *G06T 17/20* (2013.01); *G06T 7/579* (2017.01); *G06T 15/04* (2013.01); *G06T 17/00* (2013.01);
(Continued)

(58) Field of Classification Search
CPC ......... G06T 17/20; G06T 7/579; G06T 17/00; G06T 15/04; G06T 2207/10024; G06T 2207/10016; G06T 2207/30201; G06T 2207/10012; H04N 13/221; H04N 13/264; H04N 13/271; H04N 13/275
See application file for complete search history.

(56) References Cited

U.S. PATENT DOCUMENTS

| 9,589,177 B2 | 3/2017 | Shor et al. |
| 2011/0102553 A1 | 5/2011 | Corcoran et al. |

(Continued)

*Primary Examiner* — Sonji N Johnson
(74) *Attorney, Agent, or Firm* — Arent Fox LLP; Michael Fainberg

(57) ABSTRACT

A system and method is provided for accurately reconstructing a three-dimensional object using depth maps. An exemplary method includes detecting different positions of an object in a multiple image frames and generating depth maps for the object from the images frames based on the detected different positions of the object. Moreover, the method includes fusing the generated depth maps to generate a three-dimensional model of the object, calculating a variance of points of the fused depth maps for the object, and obtaining respective variances of points of a statistical value prior that correspond to the points of the fused depth maps. Finally, the method calculates a quality fitting result of the generated three-dimensional model of the object based on the calculated variance of the points of the fused depth maps and the respective variances of the corresponding points of the statistical value prior.

18 Claims, 10 Drawing Sheets

(51) Int. Cl.
  *H04N 13/275* (2018.01)
  *H04N 13/271* (2018.01)
  *G06T 7/579* (2017.01)
  *G06T 17/00* (2006.01)
  *H04N 13/221* (2018.01)
  *H04N 13/264* (2018.01)

(52) U.S. Cl.
  CPC ......... *H04N 13/221* (2018.05); *H04N 13/264* (2018.05); *H04N 13/271* (2018.05); *H04N 13/275* (2018.05); *G06T 2207/10012* (2013.01); *G06T 2207/10016* (2013.01); *G06T 2207/10024* (2013.01); *G06T 2207/30201* (2013.01)

(56) References Cited

U.S. PATENT DOCUMENTS

| | | | |
|---|---|---|---|
| 2013/0129194 A1 | 5/2013 | Gusis et al. | |
| 2013/0201167 A1* | 8/2013 | Oh | H01L 27/14656 345/207 |
| 2015/0003666 A1* | 1/2015 | Wang | G06K 9/00463 382/100 |
| 2017/0018088 A1 | 1/2017 | Jeong et al. | |

* cited by examiner

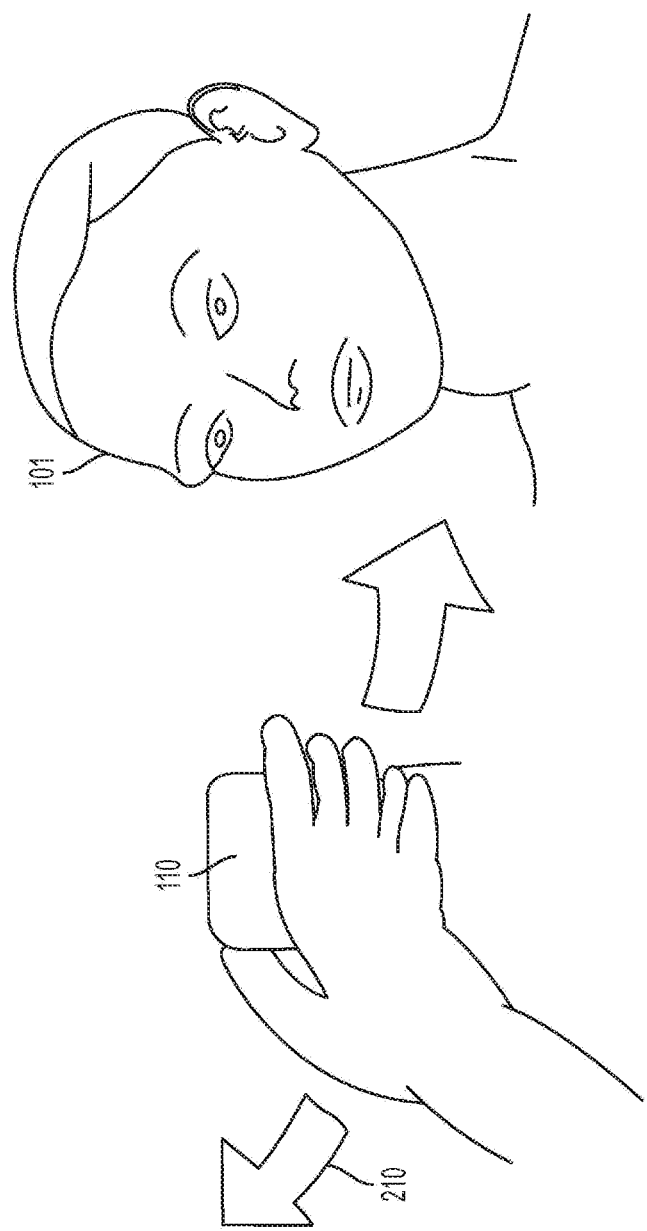

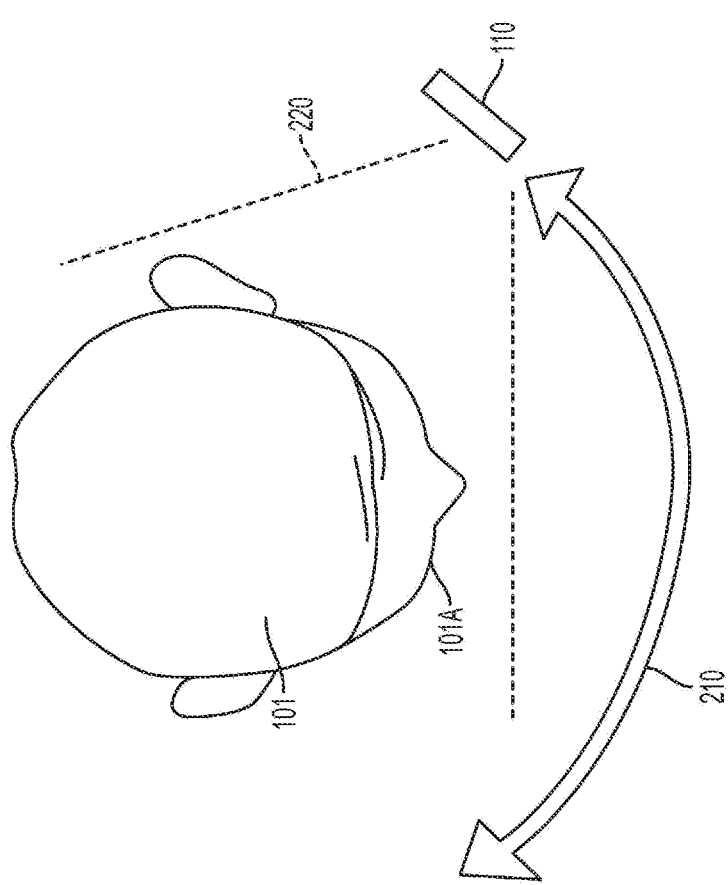

SYSTEM AND METHOD FOR THREE DIMENSIONAL OBJECT RECONSTRUCTION AND QUALITY MONITORING

CROSS REFERENCE TO RELATED APPLICATIONS

This application is a continuation-in-part of U.S. application Ser. No. 15/030,837, filed on Apr. 20, 2016, which in turn is a National Stage entry of International Application No. PCT/IB2014/002226, filed on Oct. 24, 2014, which claims priority to Swiss Application No. CH01801/13, filed on Oct. 25, 2013, the contents of each of these priority applications are hereby incorporated by reference in their entirety.

TECHNICAL FIELD

The present disclosure relates generally to object reconstruction and identity verification using a mobile device, and, more particularly, to a system and method for performing three dimensional object reconstruction and quality monitoring.

BACKGROUND

Electronic applications and digital services have continuously expanded over the last decade where both consumer and corporate markets have driven the adoption of mobile/wireless communication handheld devices, such as Android®, iOS®, BlackBerry® smartphones and tablets. However, despite that all of these services provide great values to end-users, there is a growing concern about security and more particularly about identity theft.

More precisely, various applications and services rely on prompting the end-user to enter a user identification and password for authentication purposes. In regards of the many hacking techniques that have been developed, it is now fairly understood the user identification and password paradigm is not secure anymore.

As a consequence, there is a huge demand in the market to find out a secure way to protect digital transactions, services or any kind of digital accesses where data must be kept confidential. Logically, the data security industry has put an important effort to develop biometric solutions, including fingerprint, iris or face scan. In the current art, biometric techniques are still very expensive and difficult to roll-out at a large scale, mainly due to the fact they require specific installations and/or scan procedures. As an example, there are many existing 3D scan solutions using fixed cameras used to reconstitute a 3D model.

One biometric technology involves a visual scan of the individual's attribute, such as the face, by using the individual's wireless handheld device. In such existing technology, 3D object reconstruction for mobile devices is based on detecting features of the biometric attribute and tracking them. In an initialization phase, the camera positions are estimated. Following frames are captured and are added in an iterative way and the camera is better estimated while computing in parallel depth maps (i.e., information relating to the distance of the surfaces of scene objects from a viewpoint) for individual pairs of frames. As a final step, all depth maps can be combined by depth map fusion algorithms to reconstruct the object in 3D.

Currently, these 3D object reconstruction approaches provide acceptable results to reconstruct 3D object with good accuracy in certain application. For example, the level of quality provided by existing technologies may be acceptable of software applications such as the reconstruction of 3D facial avatars or printing out of 3D figurines. However, when requiring higher accuracy (e.g., to protect confidential electronic data), the method requires a significant number of iterations and key frames to reconstruct accurate 3D models. Moreover, the quality of the data and its correspondence is still unknown.

SUMMARY

Accordingly, a system and method is needed to perform three dimensional object reconstruction and quality monitoring to quickly and efficiently determine that the fitting of the reconstructed object is acceptable with a certain confidence threshold.

Thus, according to an exemplary aspect, a method is disclosed for accurately reconstructing a three-dimensional object using depth maps. In this aspect, the method includes detecting a plurality of different positions of an object in a plurality of image frames, respectively; generating a plurality of depth maps for the object from the plurality of images frames based on the detected plurality of different positions of the object, respectively; fusing the generated plurality of depth maps to generate a three-dimensional model of the object; calculating a variance of a plurality of points of the fused depth maps for the object; obtaining respective variances of points of a statistical value prior that correspond to the plurality of points of the fused depth maps; and calculating a quality fitting result of the generated three-dimensional model of the object based on the calculated variance of the plurality of points of the fused depth maps and the respective variances of the corresponding points of the statistical value prior.

In another aspect, the exemplary method includes confirming an accuracy of the generated three-dimensional model of the object when the calculated quality fitting result satisfies a predetermined quality threshold.

In another aspect of the exemplary method, the statistical shape prior is a morphable face model that represent a variability of a plurality of existing faces.

In another aspect of the exemplary method, each variance of each of the plurality of points is calculated as $$\operatorname{var}(\overline{p}_J) = \frac{1}{n}\sum_{i=1}^{n}(p_{k_i,i} - \overline{p}_J)^2,$$

wherein n is a number of depth maps with $d_i$ being the i-th depth map and $p_{i,x,y} = p_{i,j}$ being the j-th point in the i-th depth map and $$\overline{p_J} = \frac{1}{n}\sum_{i=1}^{n} p_{k_i,i},$$

wherein $k_i$ is variable per integrated depth map $d_i$.

In another aspect, the exemplary method includes selecting the plurality of points of the fused depth maps for the object and the respective points of the statistical value prior when each selected pair is within a predetermined distance threshold.

In another aspect, the exemplary method includes calculating the quality fitting result as $$Q = \sum_{a=1}^{o} \frac{\text{var}(\overline{v_{l(a)}})}{\text{var}(\overline{p_{J(a)}})},$$

where l(a) and j(a) correspond to a picked index for the fused plurality of depth maps and the statistical shape prior, respectively, and o is the number of selected pairs.

In another aspect, the exemplary method includes selecting l(a) and j(a) based on an Iterative Closest Point algorithm, such that $\overline{v_{l(a)}}$ and $\overline{p_{j(a)}}$ are selected as the nearest neighbors as a pair of points between the fused depth maps for the object and the statistical value prior.

In another exemplary aspect, a system is disclosed for accurately reconstructing a three-dimensional object using depth maps. In this aspect, the system includes a memory configured to store a statistical value prior; and at least one processor configured to detect a plurality of different positions of an object in a plurality of image frames, respectively, generate a plurality of depth maps for the object from the plurality of images frames based on the detected plurality of different positions of the object, respectively, fuse the generated plurality of depth maps to generate a three-dimensional model of the object, calculate a variance of a plurality of points of the fused depth maps for the object, obtain respective variances of points of a statistical value prior that correspond to the plurality of points of the fused depth maps, and calculate a quality fitting result of the generated three-dimensional model of the object based on the calculated variance of the plurality of points of the fused depth maps and the respective variances of the corresponding points of the statistical value prior.

In another exemplary aspect, the system includes at least one camera configured to capture the plurality of image frames.

In another exemplary aspect of the system, the camera comprises a two-dimensional image sensor that captures the plurality of images frames when a user moves the image sensor about the object.

In another exemplary aspect of the system, the camera comprises a three-dimensional image sensor configured to capture the plurality of images frames.

In another exemplary aspect of the system, the at least one processor and the memory is located on a remote server communicatively coupled to the at least one camera.

In another exemplary aspect of the system, the at least one processor is further configured to confirm an accuracy of the generated three-dimensional model of the object when the calculated quality fitting result satisfies a predetermined quality threshold.

In another exemplary aspect of the system, the statistical shape prior is a morphable face model that represent a variability of a plurality of existing faces.

In another exemplary aspect of the system, the at least one processor is further configured calculate each variance of each of the plurality of points as $$\text{var}(\overline{p_J}) = \frac{1}{n}\sum_{i=1}^{n} (p_{k_i,i} - \overline{p_J})^2,$$

wherein n is a number of depth maps with $d_i$ being the i-th depth map and $p_{i,x,y} = p_{i,j}$ being the j-th point in the i-th depth map and $$\overline{p_J} = \frac{1}{n}\sum_{i=1}^{n} p_{k_i,i},$$

wherein $k_i$ is variable per integrated depth map $d_i$.

In another exemplary aspect of the system, the at least one processor is further configured to select the plurality of points of the fused depth maps for the object and the respective points of the statistical value prior when each selected pair is within a predetermined distance threshold.

In another exemplary aspect of the system, the at least one processor is further configured to calculate the quality fitting result as $$Q = \sum_{a=1}^{o} \frac{\text{var}(\overline{v_{l(a)}})}{\text{var}(\overline{p_{J(a)}})},$$

where l(a) and j(a) correspond to a picked index for the fused plurality of depth maps and the statistical shape prior, respectively, and o is the number of selected pairs.

In another exemplary aspect of the system, the at least one processor is further configured to select l(a) and j(a) based on an Iterative Closest Point algorithm, such that $\overline{v_{l(a)}}$ and $\overline{p_{j(a)}}$ are selected as the nearest neighbors as a pair of points between the fused depth maps for the object and the statistical value prior.

In yet another exemplary aspect, a non-transitory computer readable medium comprising computer executable instructions is disclosed for accurately reconstructing a three-dimensional object using depth maps. In this aspect, instructions are provided for detecting a plurality of different positions of an object in a plurality of image frames, respectively; generating a plurality of depth maps for the object from the plurality of images frames based on the detected plurality of different positions of the object, respectively; fusing the generated plurality of depth maps to generate a three-dimensional model of the object; calculating a variance of a plurality of points of the fused depth maps for the object; obtaining respective variances of points of a statistical value prior that correspond to the plurality of points of the fused depth maps; and calculating a quality fitting result of the generated three-dimensional model of the object based on the calculated variance of the plurality of points of the fused depth maps and the respective variances of the corresponding points of the statistical value prior.

In another exemplary aspect of the non-transitory computer readable medium, instructions are included for confirming an accuracy of the generated three-dimensional model of the object when the calculated quality fitting result satisfies a predetermined quality threshold.

The above summary of example aspects serves to provide an understanding of the invention. This summary is not an extensive overview of all contemplated aspects, and is intended to neither identify key or critical elements of all aspects nor delineate the scope of any or all aspects of the invention. Its sole purpose is to present one or more aspects in a concise form as a prelude to the more detailed description of the invention that follows. To the accomplishment of the foregoing, the one or more aspects of the invention include the features described and particularly pointed out in the claims.

BRIEF DESCRIPTION OF THE DRAWING

The accompanying drawings, which are incorporated into and constitute a part of this specification, illustrate one or more example aspects of the invention and, together with the detailed description, serve to explain their principles and implementations.

FIGS. 2A to 2C illustrate a process of performing a self-scanning by a user in order to perform three dimensional object reconstruction and quality monitoring according to an exemplary aspect.

DETAILED DESCRIPTION

Figure 1:
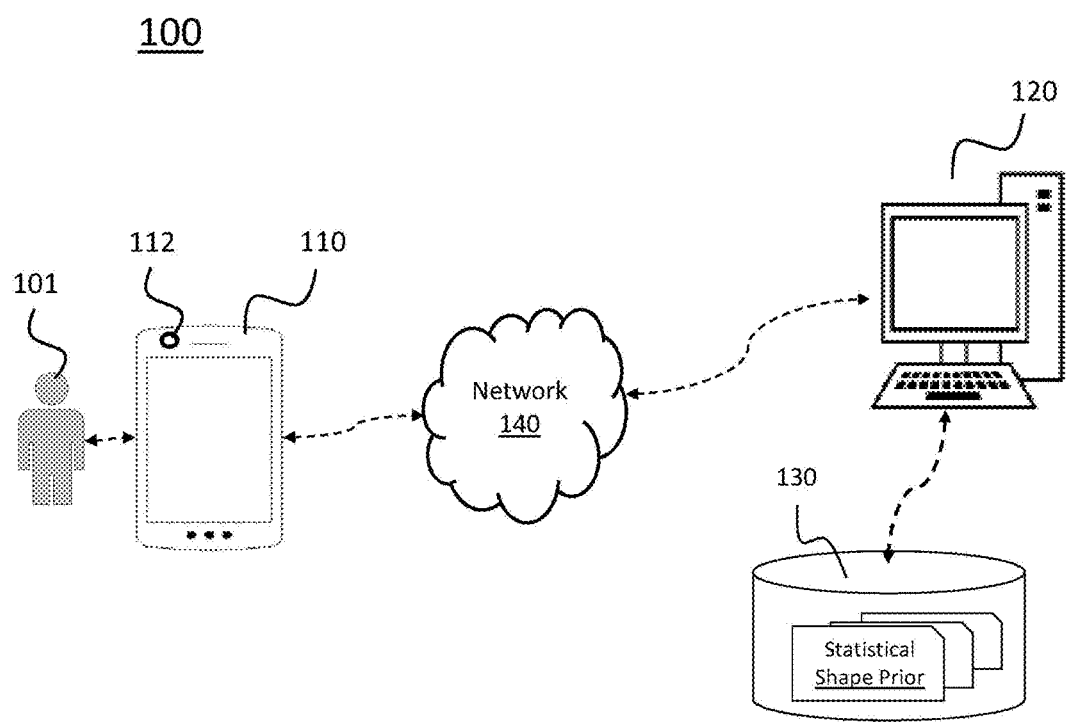
FIG. 1 illustrates a block diagram of a system for performing three dimensional object reconstruction and quality monitoring according to an exemplary aspect.

Various exemplary aspects are now described with reference to the drawings, wherein like reference numerals are used to refer to like elements throughout. In the following description, for purposes of explanation, numerous specific details are set forth in order to promote a thorough understanding of one or more aspects. It may be evident in some or all instances, however, that any aspect described below can be practiced without adopting the specific design details described below. In other instances, well-known structures and devices are shown in block diagram form in order to facilitate description of one or more aspects. The following presents a description of one or more exemplary aspects in order to provide a basic understanding of the disclosed system and method. This description is not an extensive overview of all contemplated aspects, and is not intended to identify key or critical elements of all aspects nor delineate the scope of any or all aspects.

FIG. 1 illustrates a block diagram of a system for performing three dimensional object reconstruction and quality monitoring according to an exemplary aspect. As shown, the system 100 includes an electronic device 110, such as a mobile device (e.g., smartphone, tablet, or the like) that is configured to perform three dimensional ("3D") object reconstruction of an object, such as a face/image of a user 101 (generally referred to as a "biometric attribute"). An exemplary utility for the object reconstruction and subsequent verification of the quality of the reconstructed 3D object is to verify the identity of the user 101 when conducting a digital transaction, such as a bank or financial transaction, for example.

As will be explained in more detail below, the mobile device 110 can include a camera 112 configured to capture a plurality of images of the object to be reconstructed and verified (e.g., the face of the user 101). Accordingly, it is contemplated that the 3D object reconstruction and verification techniques described herein can be implemented on current smartphones in the marketplace, such as an Apple iPhone® or Samsun Galaxy®, for example. In such an exemplary implementation, the mobile device 110 can be installed with special-purpose software applications for performing the reconstructing and fitting algorithms described herein.

As further shown in FIG. 1, the mobile device 110 can be communicatively coupled to a remote server 120 (i.e., an identification verification server 120) that can be configured to perform the 3D object reconstruction and fitting according to an exemplary aspect. In general, it should be understood that the network 140 is any type of applicable network for communicating data and data operations and can include a communication system (not shown) that connects the various components of the system 100 by wire, cable, fiber optic, and/or wireless links facilitated by various types of well-known network elements, such as hubs, switches, routers, and the like. It should be appreciated that the network may employ various well-known protocols to communicate information amongst the network resources. In one aspect, the network can be part of the Internet as would be understood to one skilled in the art.

As will be explained in detail below, the 3D object reconstruction described herein is performed using a statistical shape prior that can be stored in an electronic database 130, for example, that is coupled to the remote server 120. The statistical shape prior is a morphable (i.e., changeable) face model that is able to represent the variability of existing faces. The statistical shape prior solves the correspondence problem of existing systems and can be used to specify a quality measurement for the 3D fitting result as will be explained in detail below.

Although the exemplary aspect shows the statistical shape prior being stored in the electronic database 130, in an alternative aspect, it can be stored directly on the mobile device 110 and/or server 120. Thus, it should be appreciated that while the remote server is configured to perform the 3D object reconstruction and verification according to an exemplary aspect, it is alternatively contemplated that the 3D object reconstruction and the fitting algorithms described herein can all be performed directly on the mobile device 110.

Moreover, in exemplary aspects, the exemplary 3D object reconstruction and fitting can be implemented using either of a two-dimensional (e.g., an RGB camera) or three-dimensional camera 112 (e.g., a depth camera), for example. In either case, the camera 112 should capture a plurality of image frames at different angles relative to the image to be captured and reconstructed. Thus, in one exemplary aspect, when the mobile device 110 , and, more particularly, a 3D object reconstruction application installed on the mobile device 110, receives an instruction to obtain a 3D object and/or verify the identity of a user 101, the mobile device will prompt the user 101 to self-scanning of a required object, such as a face or hand of the user, for example.

Figure 2C:
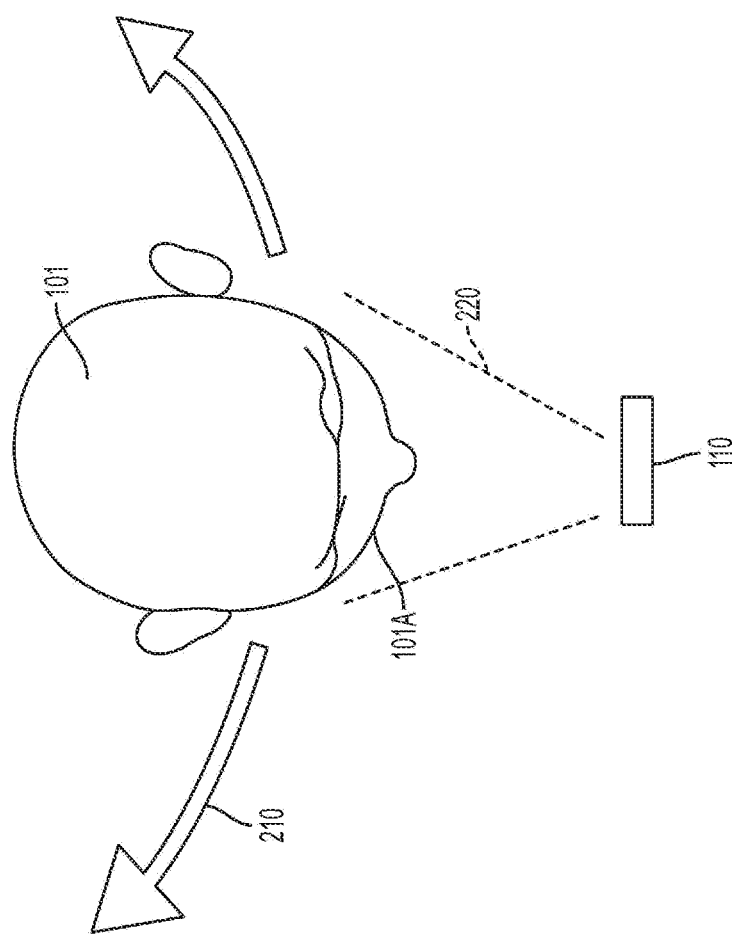

FIGS. 2A to 2C illustrate a process of performing a self-scanning by a user in order to perform three dimensional object reconstruction and quality monitoring according to an exemplary aspect. As shown initially in FIG. 2A, the user 101 may be prompted by the mobile device 110 (having a 2D image sensor, for example) to perform a panning of a biometric attribute (e.g., the user's face 101A) that needs to be scanned. For example, although not shown, the mobile device 110 may include instructions on a user interface that indicate panning directions 210 for the image capture of the biometric attribute. In an alternative aspect, the images can be captured by moving the face relative to the camera 112 and/or mobile device 110.

As further shown in FIGS. 2B and 2C, as the user moves the mobile device 110 in the various positions indicated by the panning direction, the camera 112 of the mobile device 110 will be activated and will begin to automatically capture images in the field of view 220 of the biometric attribute that is designated to be self-scanned. Although not shown, in should be appreciated that while the users biometric attribute is scanned (e.g., the face 101A of the user 101), captured frames can be displayed on the interface of the camera 101. Moreover, in one aspect, further directions can be displayed on the mobile device 110 and/or an audio message can be played, that instruct the user 101 to move the camera 112 to different positions and distances to ensure the required frames are captured for the 3D object reconstruction and fitting.

As the user 101 makes the panning movements according to the indicated panning direction 210 and the mobile device captures images in the field of view 220, the mobile device 110 and/or the remote identification verification server 120 perform the 3D object reconstruction and fitting. For example, in one aspect, the mobile device 110 is configured to reconstruct a 3D model of the biometric attribute (e.g., the user's face 101A) from the frame sequence captured by the camera 112 by extracting the shapes and textures or a subset of shapes and textures of the scanned biometric attribute, computing in parallel depth maps, fusing the depth maps to reconstruct the biometric attribute and verifying the fitting quality measurement of the reconstruction. In another aspect, the mobile device 110 is configured to reconstruct the biometric attribute and send the reconstructed biometric attribute to the remote identification verification server 120 to verify the quality measurement of the reconstruction. In yet another aspect, the mobile device 110 is configured to transmit the sequence of capture frames of the biometric image to the remote identification verification server 120 (over network 140, for example), that performs the 3D object reconstruction and quality measurement of the reconstruction. The details of the 3D object reconstruction and fitting will be described as follows.

Figure 3:
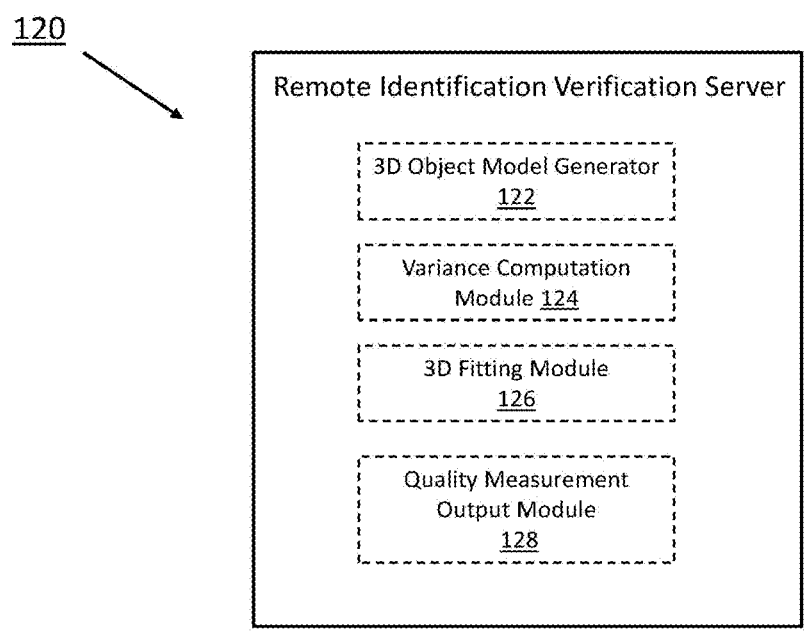
FIG. 3 illustrates a block diagram of a device for performing three dimensional object reconstruction and quality monitoring according to an exemplary aspect.

FIG. 3 illustrates a block diagram of a device for performing three dimensional object reconstruction and quality monitoring according to an exemplary aspect. In the exemplary embodiment, the device is shown to be remote identification verification server 120. However, as noted above, the 3D object reconstruction and fitting algorithms described herein can be implemented on the mobile device 110 according to an alternative aspect. In yet a further aspect, the functionality can be spread across the mobile device 110 and the remote identification verification server 120.

As shown, the remote identification verification server 120 can include a plurality of components and modules configured to perform the 3D object reconstruction and fitting. Moreover, while not shown the remote identification verification server 120 will include one or more processors and memory with software instructions stored thereon, which, when executed by the processor execute the disclosed algorithms. As noted above, the remote identification verification server 120 can be coupled to an electronic database or memory that stores the statistical value prior.

According to the exemplary aspect, the remote identification verification server 120 includes 3D object model generator 122, variance computation module 124, 3D fitting module 126, and quality measurement output module 128. In general, the term "module" as used herein can refer to a software service or application executed on one or more computers, including real-world devices, components, or arrangement of components implemented using hardware, such as by an application specific integrated circuit (ASIC) or field-programmable gate array (FPGA), for example, or as a combination of hardware and software, such as by a microprocessor system or graphical processing unit (GPU) and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation described herein.

As described above, the disclosed system and method herein is generally to provide a computing of a quality measurement for a final 3D fitting result. To initiate the object reconstruction, the camera 112 of the mobile device 110 obtains a plurality of frames and, as the mobile device 110 moves by panning, for example, the mobile device 110 is configured to detect multiple position changes of the object to be reconstructed (e.g., the face 101A of the user 101). Based on the acquired image data, the 3D object model generator 122 is configured to generate a plurality of depth maps based on multiple qualified position changes of the object. In addition, the 3D object model generator 122 is configured to generate an accurate 3D object model by fusing the multiple depth maps $d_i$.

Figure 4:
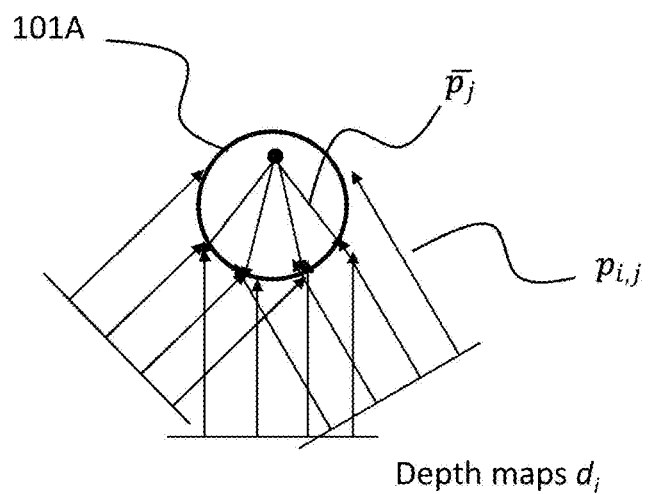
FIG. 4 illustrates a diagram of a generation of depth maps $d_i$ for performing three dimensional object reconstruction and quality monitoring according to an exemplary aspect.

FIG. 4 illustrates a conceptual diagram of a generation of depth maps for performing three dimensional object reconstruction and quality monitoring according to an exemplary aspect. As shown, a plurality of rays to the surface 101A are shown and to the height map center and a sequence of images can be obtained for the object to be reconstructed (e.g., the face 101A of the user 101). Moreover, in the exemplary aspect, a plurality of depth maps are generated with $d_i$ being the i-th depth map and $p_{i,x,y}=p_{i,j}$, which is the j-th point (at x, y) in the i-th depth map. Moreover, $$\overline{p_j} = \frac{1}{n}\sum_{i=1}^{n} p_{k_i,i}$$

is the j-th point in the fused depth map $\overline{d}$ computed from all depth maps where $k_i$ can vary per integrated depth map $d_i$. That is, for a plurality of selected points of the object, a fused point will be calculated (e.g., the j-th point) from the fused depth map $\overline{d}$. Each fused point will then be fitted against a point selected in the statistical value prior that corresponds to this point as will be discussed in detail below.

Referring back to FIG. 3, a variance computation module 124 is configured to compute a variance $var(\overline{p_j})$ for each selected point of the fused depth map $\overline{d}$. In other words, the depth map fusion enables an estimation of the variance per individual point. Thus, when fusing the multiple depth maps into one fused depth map for each point, multiple depth maps are taken into account, which enable the variance computation module 124 to compute the variance of each point. Following the 3D fitting process, the computed variance $var(\overline{p_j})$ for can be used to calculate a quality measurement Q.

Moreover, it is also known for each point in the statistical shape prior how much variance is present. The combination of these two variance values per point and over the whole dataset enables the computation of a robust measurement of the 3D fitting result, which indicates an amount of flexibility (or unreliability) in the final 3D object reconstruction. It is further noted that in one exemplary aspect, if the image sensor is a 3D sensor and provides a confidence value, this confidence value can also be integrated the same as the variance of points in the depth map, for example.

Figure 5:
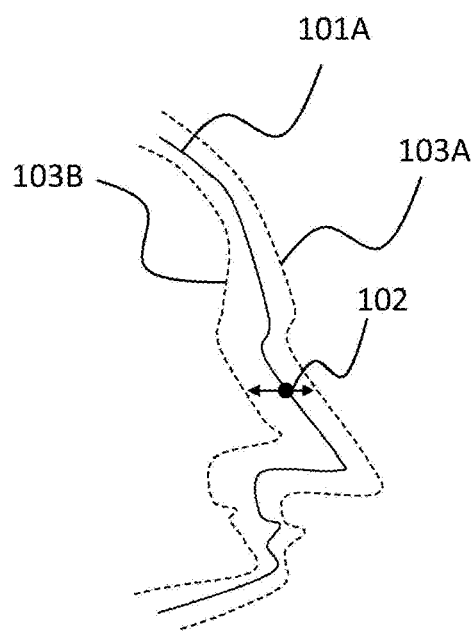
FIG. 5 illustrates a conceptual diagram of a variance $var(\overline{p}_j)$ for a fused depth map $\overline{d}$ according to an exemplary aspect.

FIG. 5 illustrates a conceptual diagram of a variance $\text{var}(\overline{p_j})$ for a fused depth map $\overline{d}$ according to an exemplary aspect. As shown, the variance at a single height map point 102 of the object surface 101A is shown by the solid bi-directional arrow in the horizontal line. That is, the variance per fused point $\overline{p_j}$ is computed by the variance computation module 124 as $$\text{var}(\overline{p_J}) = \frac{1}{n}\sum_{i=1}^{n}(p_{k_j,i} - \overline{p_J})^2.$$

In addition, the variance computation module 124 obtains a variance for the statistical shape prior. That is, the statistical shape prior (e.g., a morphable face model) has a reference mesh that includes a plurality of vertices. For each of these vertices, the morphable model gives a variance (i.e., a variance of the statistical prior). More particularly, in an exemplary aspect, the statistical shape prior is based on n samples $s_i$ with points (vertex) $v_{l,i}$ that are in correspondence. The number of vertex per sample ($l=\{1 \ldots m\}$) is equal for all samples in the exemplary aspect. Moreover, the means $\overline{s}$ of all samples has vertex $$\overline{v_l} = \frac{1}{n}\sum_{i=1}^{n}v_{l,i}.$$

The variance per vertex $\overline{v_l}$ is then given by $$\text{var}(\overline{v_l}) = \frac{1}{n}\sum_{i=1}^{n}(v_{l,i} - \overline{v_l})^2.$$

As an example, this variance $\text{var}(\overline{v_l})$ is shown by the dashed lines 103A and 103B relative to the surface 101A in FIG. 5.

Again, referring back to FIG. 3, the 3D fitting module 126 is configured to perform the 3D fitting using the fused based depth map and computing the fitting quality based on the variances $\text{var}(\overline{p_j})$ and $\text{var}(\overline{v_l})$ determined by the variance computation module 124. In an exemplary aspect, during the fitting, the reference (i.e., the statistical value prior) is deformed to match the given data of the fused based depth map, which has an unknown number of 3D points. When fitting for each vertex of the reference mesh, a nearest neighbor in the point cloud is searched. However, only pairs that fulfill certain conditions are taken into account. For example, the 3D fitting module 126 may use o pairs (i.e. "1 to o" pairs), and this can be performed in an iterative way and in each iteration it can be different point pairs that fulfill the conditions. Thus, each pair of points corresponds to a point from the fused depth map and a corresponding point in the reference mesh.

According to exemplary aspect, the conditions for select the pairs of points can include, for example, a maximum distance, a maximum cosine distance of normal, and, if color is used, a maximum color distance, such as RGB L2 norm, HSV L2 norm, H-distance in HSV or in any other color space, for example. Moreover, the conditions can take into account from how many depth maps the point in the height map is computed and if the point is based on a small number (e.g. <0.3*n where n=number of depth maps), then the point in the height map can be ignored.

Based on the fitting results, the 3D fitting module 126 is configured to compute a quality measurement Q based on the average variance present in the result of the selected pair of points, where Q can be calculated as $$Q = \sum_{a=1}^{o}\frac{\text{var}(\overline{v_{l(a)}})}{\text{var}(\overline{p_{J(a)}})},$$

where l(a) and j(a) correspond to a picked index for the fused depth map and statistical shape prior, respectively, which is for both independent and must not contain all points/vertex available. Thus, according to an exemplary aspect, l(a) and j(a) are selected by the 3D fitting performed by the 3D fitting module 126 and can be based on the Iterative Closest Point ("ICP") algorithm and optimized to select $\overline{v_{l(a)}}$ and $\overline{p_{j(a)}}$ to be nearest neighbors as a pair of points. Thus, it should be appreciated that the quality measurement Q is based only on the point pairs that have been selected (i.e. "1 to o" pairs). For the individual point pair 'a' in the statistical value prior and in the point cloud, an index is required that defines the pair. This is denoted by l(a) and j(a) for the statistical value prior and the point cloud, respectively.

Finally, the quality measurement output module 128 is configured to output the calculated quality measurement Q, which indicates whether the reconstruction and fitting was successful, e.g., above a predetermined threshold that can be set by an administrator for example. In other words, for many real-world applications, such as financial transactions and the like, it is important to confirm whether the reconstruction/fitting was solved within a required quality to confirm with a certain accuracy and confidence whether the identity of the individual (e.g., user 101) can be verified.

According to the exemplary aspect, the calculated quality measurement Q will be small, indicating a bad quality of the reconstruction, if the fitting is based on vertex from the model with small variance, which are less important for the result, and/or the variance per point of the fused depth map is high. In contrast, the calculated quality measurement Q will have a high value, indicated a good quality of the reconstruction, if the fitting is based on vertex with large variance and/or the variance per point of the fused depth map is small. Importantly, the variance of the statistical value prior is used for the computation of the quality measurement Q since the fitting will never be based on all/the same points.

This is important since not all points of the statistical value prior have the same variance, and, therefore, provide varying levels of helpful information. For example, the tip of the tip of the nose of the morphable statistical value prior will have a high variance and thus also highly influence the overall result of the fitting process compared with a point on the forehead that has a rather low variance and does influence the result much less. This result is shown in FIG. 5 in which the variance at the forehead (i.e., the space and distance between dashed lines 103A and 103B) is much smaller than the variance at the tip of the nose. Thus, be performing the fitting with points that have a high variance in the statistical value prior gives much more robust results than if the fitting is just based on points with low variance since a correspondence is much more indicative of a quality fit/match.

In general, a 3D fitting is a complex process that always converges. However, to qualify if a fit was successful or not can be very difficult analysis as the statistical model only explains the data (i.e., being a statistical shape prior). According to the exemplary aspects described herein, using statistical information (i.e., the variances) from the data and the statistical value prior enables a determination of how robustly the fitting result is estimated. In other words, the quality measurement Q indicates what flexibility is remaining.

As a result, this flexibility enables a threshold to be determined for acceptable results of the fitting (which also depending on the application of the data). According to the exemplary aspect, the learning process of the threshold can be solved in a data driven way, i.e., it will heavily depend on the real data used and must therefore be estimated on a per use case. In other words, for given examples, the quality must be computed and a label for the threshold must be manually assigned, for example. This enables the distribution of labels and quality value to set a threshold. Thus, depending on the application (e.g., identification verification), it possible to compute statistics for the verification (e.g., a receiver operating characteristic curve). These curves can be computed on subsets of the test data selected by varying the threshold for accepting the quality or rejecting the quality. In this way, it is possible to evaluate for which lower quality the receiver operating characteristic curve starts to become much worse, which means the curve is not getting worse because of the verification method, but the data quality. As such, a threshold can be set accordingly.

Figure 6A:
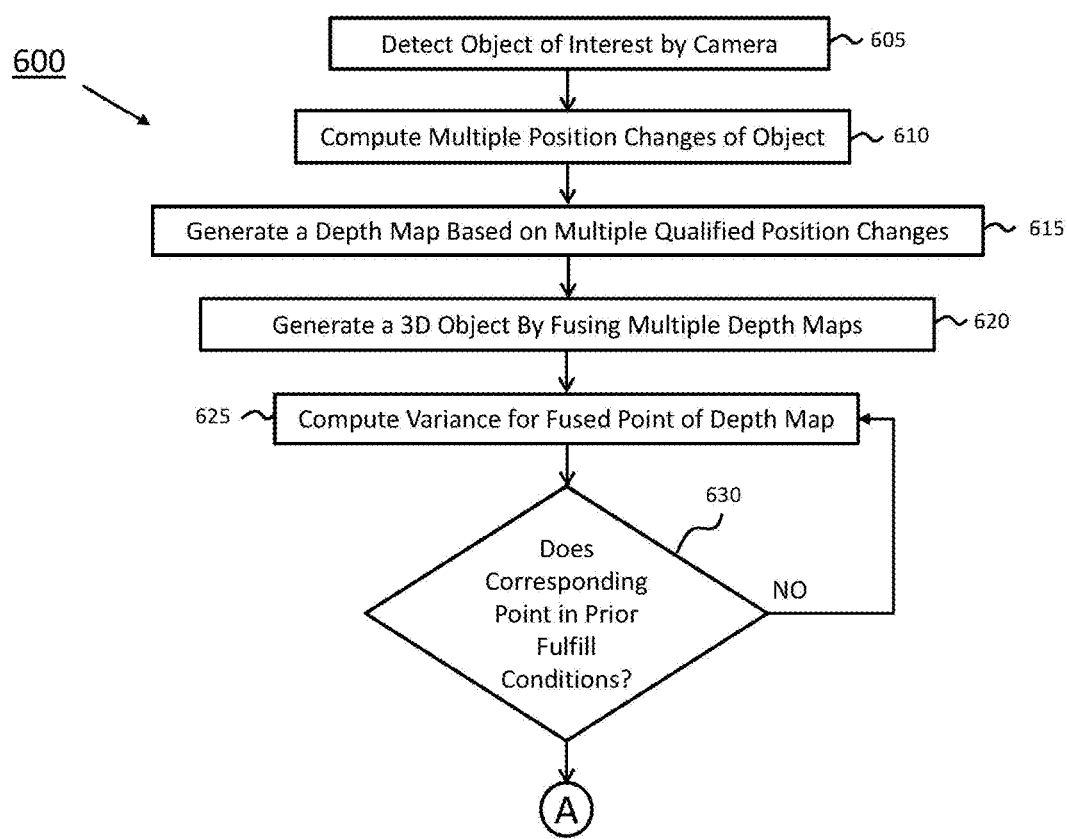
FIGS. 6A and 6B illustrates a flowchart of a method for performing three dimensional object reconstruction and quality monitoring according to an exemplary aspect.
Figure 6B:
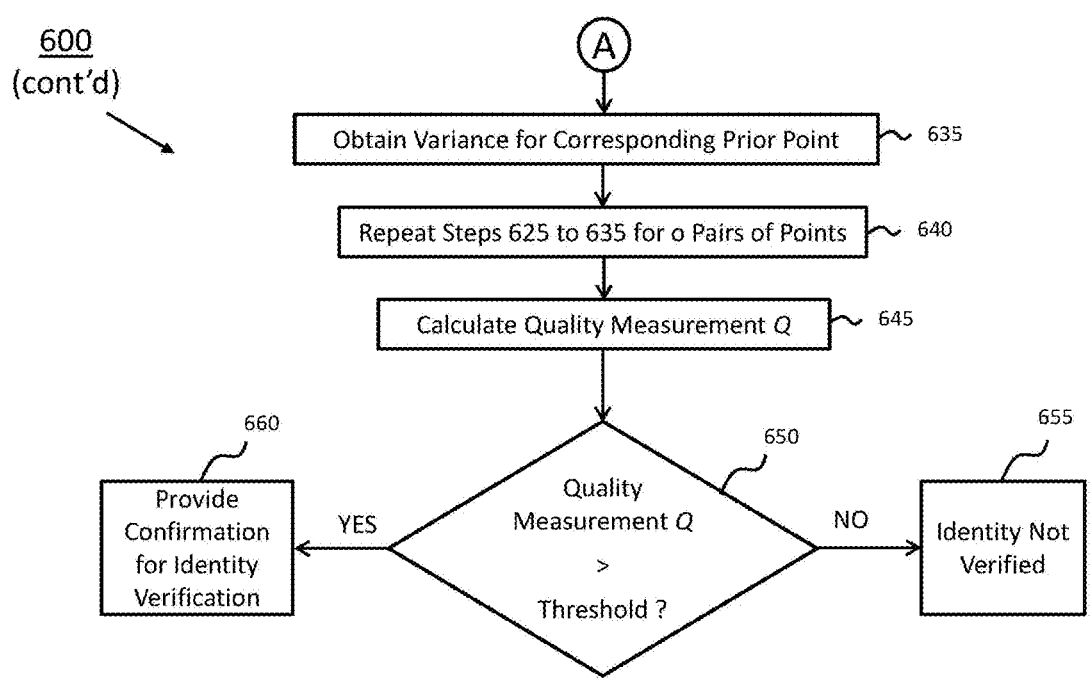

FIGS. 6A and 6B illustrates a flowchart of a method for performing three dimensional object reconstruction and quality monitoring according to an exemplary aspect. As shown, initially at step 605, camera 112 of mobile device 110, for example, can detect an object of interest (e.g., face 101A) of user 101. Next, in response to panning movement, for example, the camera will compute multiple position changes of objects at step 610. Then, based on qualified position changes, the 3D object model generator 122 can generate a depth map at step 615. For example, in one aspect, the qualified position changes can be a predefined distance moved between the two images. Alternatively, additional criteria can include the speed the camera/user moved (e.g., higher speed lead to motion blur which leads to worse data which leads to worse reconstruction).

The 3D object model generator 122 can then fuse a plurality of depth maps together to generate (i.e., reconstruct) the 3D object of interest (e.g., face 101A) at step 620. Then, for a selected number of points in the fused depth map, the variance computation module 124 is configured to compute a variance $var(\overline{p_j})$ for each such selected point of the fused depth map $\overline{d}$ at step 625.

Next, at step 630, the fitting to the statistical value prior can be performed by identifying corresponding points in the prior (i.e., pairs of points) as long as the correspondence fulfills the point selection conditions as described above. If not, the method returns to step 625 and attempts to select the next pair of points. Otherwise, the method proceeds to step 635 where the variance $var(\overline{v_l})$ can be obtained for the corresponding point in the statistical value prior. Steps 625 to 625 can be repeated for "o" pairs of points such that the variance $var(\overline{p_j})$ and the variance $var(\overline{v_l})$ is obtained for each of the o pair of points (step 640). Finally, at step 650, the quality measurement Q can be calculated using these variances as described above.

In an exemplary aspect, if the quality measurement Q is less than a predefined threshold, then it will be determined that the fitting was not of sufficient quality, for example, and the user's identify may not be verified at step 655. Alternatively, in this exemplary aspect, if the quality measurement Q is greater than a predefined threshold, then it will be determined that the fitting was of sufficient quality at step 660. This confirmation of quality can then be used to verify the user's identify, for example, by applying a distance metric on the fitted face to verify the user's identity. Thus, using the exemplary method described herein, the algorithms enable a determination of how robustly the fitting result is estimated.

Figure 7:
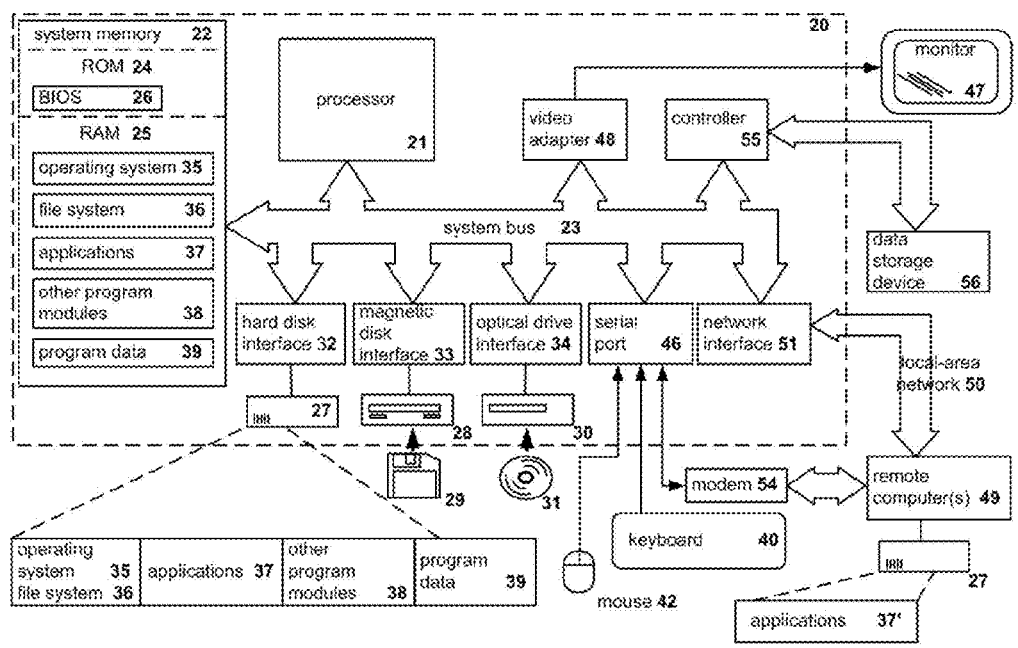
FIG. 7 illustrates a block diagram illustrating a general-purpose computer system on which aspects of systems and methods may be implemented in accordance with an exemplary aspect.

FIG. 7 illustrates a block diagram illustrating a general-purpose computer system on which aspects of systems and methods may be implemented in accordance with an exemplary aspect. It is noted that the computer system 20 can correspond to the device and system described above for performing three dimensional object reconstruction and quality monitoring according to the exemplary aspects. For example, in one aspect, computer system 20 can correspond to remote identification verification server 120. In other aspect, the applicable components of computer system 20 can correspond to those of mobile device 110.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

As described above, computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed:

1. A method for accurately reconstructing a three-dimensional object using depth maps, the method comprising:
   detecting a plurality of different positions of an object in a plurality of image frames, respectively;
   generating a plurality of depth maps for the object from the plurality of images frames based on the detected plurality of different positions of the object, respectively;
   fusing the generated plurality of depth maps to generate a three-dimensional model of the object;
   calculating a variance of a plurality of points of the fused depth maps for the object;
   obtaining respective variances of points of a statistical value prior that correspond to the plurality of points of the fused depth maps; and
   calculating a quality fitting result of the generated three-dimensional model of the object based on the calculated variance of the plurality of points of the fused depth maps and the respective variances of the corresponding points of the statistical value prior,
   wherein each variance of each of the plurality of points is calculated as $$\mathrm{var}(\overline{p_J}) = \frac{1}{n}\sum_{i=1}^{n}(p_{k_i,i} - \overline{p_J})^2,$$

wherein n is a number of depth maps with $d_i$ being the i-th depth map and $p_{i,x,y} = p_{i,j}$ being the j-th point in the i-th depth map and $$\overline{p_J} = \frac{1}{n}\sum_{i=1}^{n} p_{k_i,i},$$

wherein $k_i$ is variable per integrated depth map $d_i$.

2. The method according to claim 1, further comprising confirming an accuracy of the generated three-dimensional model of the object when the calculated quality fitting result satisfies a predetermined quality threshold.

3. The method according to claim 1, wherein the statistical value prior is a morphable face model that represents a variability of a plurality of existing faces.

4. The method according to claim 1, further comprising selecting the plurality of points of the fused depth maps for the object and the respective points of the statistical value prior when each selected pair is within a predetermined distance threshold.

5. The method according to claim 4, further comprising calculating the quality fitting result as $$Q = \sum_{a=1}^{o} \frac{\text{var}(\overline{v_{l(a)}})}{\text{var}(\overline{p_{J(a)}})},$$

where l(a) and j(a) correspond to a picked index for the fused plurality of depth maps and the statistical shape prior, respectively, and o is the number of selected pairs.

6. The method according to claim 5, further comprising selecting l(a) and j(a) based on an Iterative Closest Point algorithm, such that $\overline{v_{l(a)}}$ and $\overline{p_{j(a)}}$ are selected as the nearest neighbors as a pair of points between the fused depth maps for the object and the statistical value prior.

7. A system for accurately reconstructing a three-dimensional object using depth maps, the system comprising:
a memory configured to store a statistical value prior; and
at least one processor configured to:
detect a plurality of different positions of an object in a plurality of image frames, respectively,
generate a plurality of depth maps for the object from the plurality of images frames based on the detected plurality of different positions of the object, respectively,
fuse the generated plurality of depth maps to generate a three-dimensional model of the object,
calculate a variance of a plurality of points of the fused depth maps for the object,
obtain respective variances of points of a statistical value prior that correspond to the plurality of points of the fused depth maps, and
calculate a quality fitting result of the generated three-dimensional model of the object based on the calculated variance of the plurality of points of the fused depth maps and the respective variances of the corresponding points of the statistical value prior,
wherein the at least one processor is further configured calculate each variance of each of the plurality of points as $$\text{var}(\overline{p_J}) = \frac{1}{n}\sum_{i=1}^{n}(p_{k_i,i} - \overline{p_J})^2,$$

wherein n is a number of depth maps with $d_1$ being the i-th depth map and $p_{i,x,y} = p_{i,j}$ being the j-th point in the i-th depth map and $$\overline{p_J} = \frac{1}{n}\sum_{i=1}^{n}p_{k_i,i},$$

wherein $k_i$ is variable per integrated depth map $d_i$.

8. The system according to claim 7, further comprising at least one camera configured to capture the plurality of image frames.

9. The system according to claim 8, wherein the camera comprises a two-dimensional image sensor that captures the plurality of images frames when a user moves the image sensor about the object.

10. The system according to claim 8, wherein the camera comprises a three-dimensional image sensor configured to capture the plurality of images frames.

11. The system according to claim 8, wherein the at least one processor and the memory is located on a remote server communicatively coupled to the at least one camera.

12. The system according to claim 7, wherein the at least one processor is further configured to confirm an accuracy of the generated three-dimensional model of the object when the calculated quality fitting result satisfies a predetermined quality threshold.

13. The system according to claim 7, wherein the statistical value prior is a morphable face model that represents a variability of a plurality of existing faces.

14. The system according to claim 7, wherein the at least one processor is further configured to select the plurality of points of the fused depth maps for the object and the respective points of the statistical value prior when each selected pair is within a predetermined distance threshold.

15. The system according to claim 14, wherein the at least one processor is further configured to calculate the quality fitting result as $$Q = \sum_{a=1}^{o} \frac{\text{var}(\overline{v_{l(a)}})}{\text{var}(\overline{p_{J(a)}})},$$

where l(a) and j(a) correspond to a picked index for the fused plurality of depth maps and the statistical shape prior, respectively, and o is the number of selected pairs.

16. The method according to claim 15, wherein the at least one processor is further configured to select l(a) and j(a) based on an Iterative Closest Point algorithm, such that $\overline{v_{l(a)}}$ and $\overline{p_{j(a)}}$ are selected as the nearest neighbors as a pair of points between the fused depth maps for the object and the statistical value prior.

17. A non-transitory computer readable medium comprising computer executable instructions for accurately reconstructing a three-dimensional object using depth maps, including instructions for:
detecting a plurality of different positions of an object in a plurality of image frames, respectively;
generating a plurality of depth maps for the object from the plurality of images frames based on the detected plurality of different positions of the object, respectively;
fusing the generated plurality of depth maps to generate a three-dimensional model of the object;
calculating a variance of a plurality of points of the fused depth maps for the object;
obtaining respective variances of points of a statistical value prior that correspond to the plurality of points of the fused depth maps; and
calculating a quality fitting result of the generated three-dimensional model of the object based on the calculated variance of the plurality of points of the fused depth maps and the respective variances of the corresponding points of the statistical value prior,
wherein each variance of each of the plurality of points is calculated as $$\text{var}(\overline{p_J}) = \frac{1}{n}\sum_{i=1}^{n}(p_{k_i,i} - \overline{p_J})^2,$$

wherein n is a number of depth maps with $d_i$ being the i-th depth map and $p_{i,x,y} = p_{i,j}$ being the j-th point in the i-th depth map and $$\overline{p_J} = \frac{1}{n}\sum_{i=1}^{n} p_{k_i,i},$$

wherein $k_i$ is variable per integrated depth map $d_i$.

18. The non-transitory computer readable medium according to claim 17, further including instructions for confirming an accuracy of the generated three-dimensional model of the object when the calculated quality fitting result satisfies a predetermined quality threshold.

\* \* \* \* \*